United States Patent
Chardon et al.

(10) Patent No.: US 7,263,414 B2
(45) Date of Patent: Aug. 28, 2007

(54) METHOD AND DEVICE FOR CONTROLLING THE ATTITUDE OF AN AIRCRAFT

(75) Inventors: Stéphane Chardon, Toulouse (FR); Jean-Philippe Sabathier, Toulouse (FR)

(73) Assignee: Airbus France, Toulouse (FR)

( * ) Notice: Subject to any disclaimer, the term of this patent is extended or adjusted under 35 U.S.C. 154(b) by 490 days.

(21) Appl. No.: 10/924,927

(22) Filed: Aug. 25, 2004

(65) Prior Publication Data

US 2005/0065672 A1    Mar. 24, 2005

(30) Foreign Application Priority Data

Aug. 26, 2003   (FR) .................................. 03 10161

(51) Int. Cl.
*G05D 1/08* (2006.01)
*B64C 1/00* (2006.01)
(52) U.S. Cl. .................. 701/4; 701/3; 701/6; 244/75.1; 244/181
(58) Field of Classification Search .................... 701/4, 701/6, 12, 3; 244/75.1, 181
See application file for complete search history.

(56) References Cited

U.S. PATENT DOCUMENTS 3,618,878 A    11/1971  Klein ......................... 244/188
3,945,590 A  * 3/1976  Kennedy et al. ............. 244/181
4,261,537 A    4/1981  Tisdale, Sr. et al. ........ 244/181

FOREIGN PATENT DOCUMENTS

GB    2292998    3/1996

* cited by examiner

*Primary Examiner*—Gertrude A. Jeanglaude
(74) *Attorney, Agent, or Firm*—Stevens, Davis, Miller & Mosher, LLP

(57) ABSTRACT

A method and device for controlling the attitude of an aircraft may employ spoilers that are arranged on the wings of the aircraft and whose respective angular positions can be adjusted by controllable actuators. A command attitude determining section determines a command attitude of the aircraft corresponding to an attitude that the aircraft must achieve. A command position calculator calculates command positions of the spoilers, corresponding to particular angular positions of the spoilers, making it possible to bring the aircraft to the command attitude. A control instruction calculator calculates control instructions for the controllable actuators, making it possible to bring the spoilers into the command positions, and applies the control instructions to the spoiler actuators.

12 Claims, 3 Drawing Sheets

METHOD AND DEVICE FOR CONTROLLING THE ATTITUDE OF AN AIRCRAFT

FIELD OF THE INVENTION

The present invention relates to a method and a device for controlling the attitude of an aircraft, in particular of a transport aircraft.

BACKGROUND OF THE RELATED ART

Even though not exclusively, the present invention applies more particularly to the gravity drop of a load which is transported in a hold of the aircraft. It is known that, in general, in order to implement such a drop:

a door of the said hold is opened; and the angle of inclination of the floor of the hold is increased to a command value in order to allow, under the effect of gravitational forces, the sliding of the load over the floor and its falling out of the hold through the said door. Parachutes which are attached to the load are then deployed in order to deposit the load on the ground.

An important parameter for such a gravity drop is the angle of inclination of the floor of the hold with respect to the horizontal. This angle of inclination is related to the attitude of the aircraft, which is equal to the sum of the angles of gradient and of incidence. For the drop to take place correctly, the angle of inclination of the floor must be greater than a predetermined value, for example substantially equal to 6° for C130 or C160 type aircraft. However, in certain flight configurations, the attitude angle of the aircraft can be such that this angle of inclination remains below the said predetermined value and therefore insufficient for carrying out such a gravity drop.

Several solutions are known which make it possible to increase the attitude angle of the aircraft:

retracting the flaps to increase the incidence and therefore the attitude angle. However, for a given speed of the aircraft, this solution has the effect of bringing the angle of incidence of the aircraft close to the angle of incidence corresponding to stalling and, consequently, it can be considered only if the safety margin with respect to the stall angle remains sufficient with regard to current standards;

dropping the load whilst climbing. At constant speed this makes it possible to increase the gradient and, consequently, the attitude of the aircraft. However, by definition, this solution cannot be considered for dropping at constant altitude;

dropping the load with a load factor. This makes it possible to increase the incidence and furthermore causes the aircraft to climb. The result of this is an increase in the attitude angle of the aircraft. However, in this case, the aircraft is no longer flying at constant altitude since it is climbing;

increasing the angle of setting the floor of the aircraft with respect to its longitudinal axis. However this is not always possible, in particular because of the geometry of the aircraft. Furthermore, it can result in a loss of space available in the hold of the aircraft and/or a reduction in the comfort of the passengers when the aircraft is also used, for example, for carrying personnel.

Consequently, the various known solutions mentioned above do not make it possible, at least in certain flight configurations of the aircraft, to carry out a gravity drop at constant speed and altitude.

SUMMARY OF THE INVENTION

The purpose of the present invention is to overcome these disadvantages. It relates to a method for controlling the attitude of an aircraft, whatever the flight conditions and configurations may be, and in particular in flight at constant speed and at constant altitude.

For this purpose, according to the invention, the said method for controlling the attitude of an aircraft, the said aircraft comprising spoilers that are arranged on the wings and whose respective angular positions can be adjusted by controllable actuators, is noteworthy in that:

a) a command attitude of the aircraft is determined corresponding to an attitude that the aircraft must achieve;

b) command positions of the said spoilers are calculated, corresponding to particular angular positions (of deflection) of the said spoilers, making it possible to bring the aircraft to the said command attitude;

c) control instructions for the said controllable actuators are calculated, making it possible to bring the said spoilers into the said command positions; and d) the said control instructions are applied to the said actuators of the said spoilers.

Thus, by means of the invention, it is possible to bring the aircraft quickly and easily into a particular command attitude, and to do so whatever the flight conditions and configurations may be, and therefore in particular to a command attitude allowing a load to be dropped from the aircraft by gravity. Furthermore, the cost is low, since the implementation of the present invention does not generally necessitate any structural modification of the aircraft. The spoilers that are used are in fact, generally, already present on the aircraft.

Advantageously, the following operations are also carried out:

e1) there is determined, for each of the said command positions of the spoilers, at least one relationship between the lift of the aircraft and the angle of incidence of the aircraft; and e2) during the application of the said control instructions to the said actuators of the spoilers, the angle of incidence of the aircraft is increased in such a way as to compensate for the reduction in the lift of the aircraft, due to the said application of the said control instructions, in order to maintain the said lift of the aircraft substantially constant.

In a particular embodiment, the following operations are also carried out:

f1) the angle of incidence of the aircraft is measured;

f2) the measured value of the angle of incidence is compared with a predetermined value; and f3) when the said measured value exceeds the said predetermined value, retraction control instructions are applied automatically and by priority to the said actuators in order that they automatically retract the said spoilers.

In a first variant embodiment, the said steps a) to c) are implemented automatically by means of the aircraft and the said step d) is initiated by an action by a pilot of the aircraft.

In a second variant embodiment, the said steps a) to c) are implemented automatically by means of the aircraft and the said step d) is initiated automatically, when the aircraft passes into a particular configuration. In this case, preferably, a pilot of the aircraft is able to adjust, if necessary, the angular positions of the said spoilers.

Furthermore, advantageously, there is additionally carried out, in an automatic manner, a servo-control of the attitude angle of the aircraft, by the intermediary of an adjustment of the angular positions of the said spoilers.

A preferred application of the said attitude control method according to the invention relates to a method of dropping by gravity at least one load which is transported in a hold of an aircraft, a method according to which:

A/ a door of the said hold is opened; and
B/ the angle of inclination of the floor of the hold is increased up to a command value in order to allow, under the effect of gravitational forces, the sliding of the load over the said floor and its falling out of the hold through the said door.

According to the invention, in order to control the angle of inclination of the floor of the hold in this case, the attitude of the aircraft is controlled, and this is done by implementing the attitude control method described above.

Advantageously, the said command positions of the said spoilers are calculated according to parameters which are representative of the said drop.

The present invention also relates to a device for controlling the attitude of an aircraft, in particular of a transport aircraft.

According to the invention, the said device is noteworthy in that it comprises:
spoilers that are arranged on the wings of the aircraft and whose respective angular positions can be adjusted by controllable actuators;
means for determining a command attitude of the aircraft corresponding to an attitude that the aircraft must achieve;
means for calculating the command positions of the said spoilers, corresponding to particular angular positions (of deflection) of the said spoilers, making it possible to bring the aircraft to the said command attitude; and
means for calculating control instructions for the said controllable actuators, making it possible to bring the said spoilers into the said command positions, the said control instructions being applied to the said actuators of the said spoilers.

BRIEF DESCRIPTION OF THE DRAWINGS

The figures of the appended drawing will give a good understanding of how the invention may be embodied. In these figures, identical references denote similar components.

DETAILED DESCRIPTION OF THE INVENTION

Figure 1:
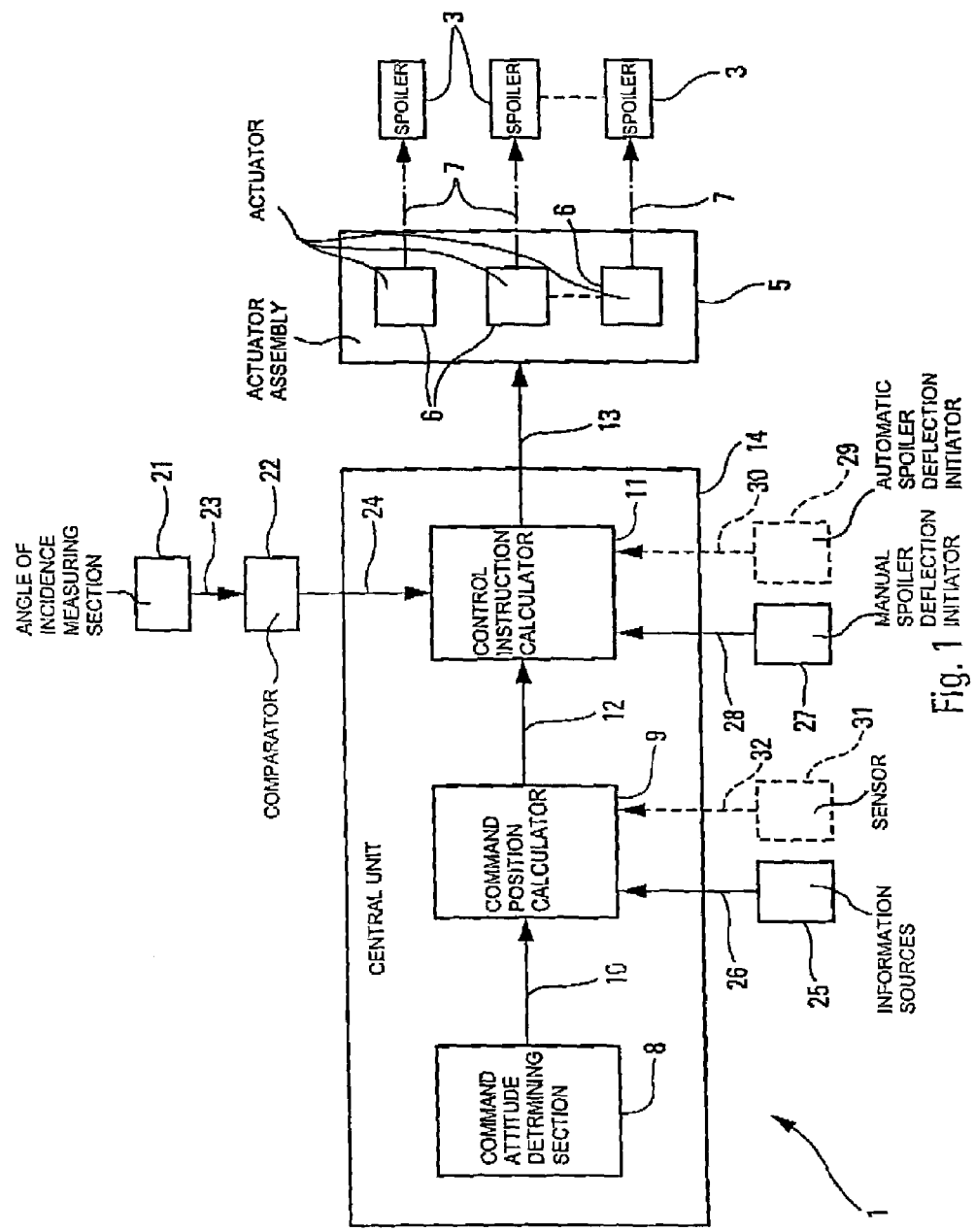
FIG. 1 is the block diagram of an attitude control device according to the invention.
Figure 2:
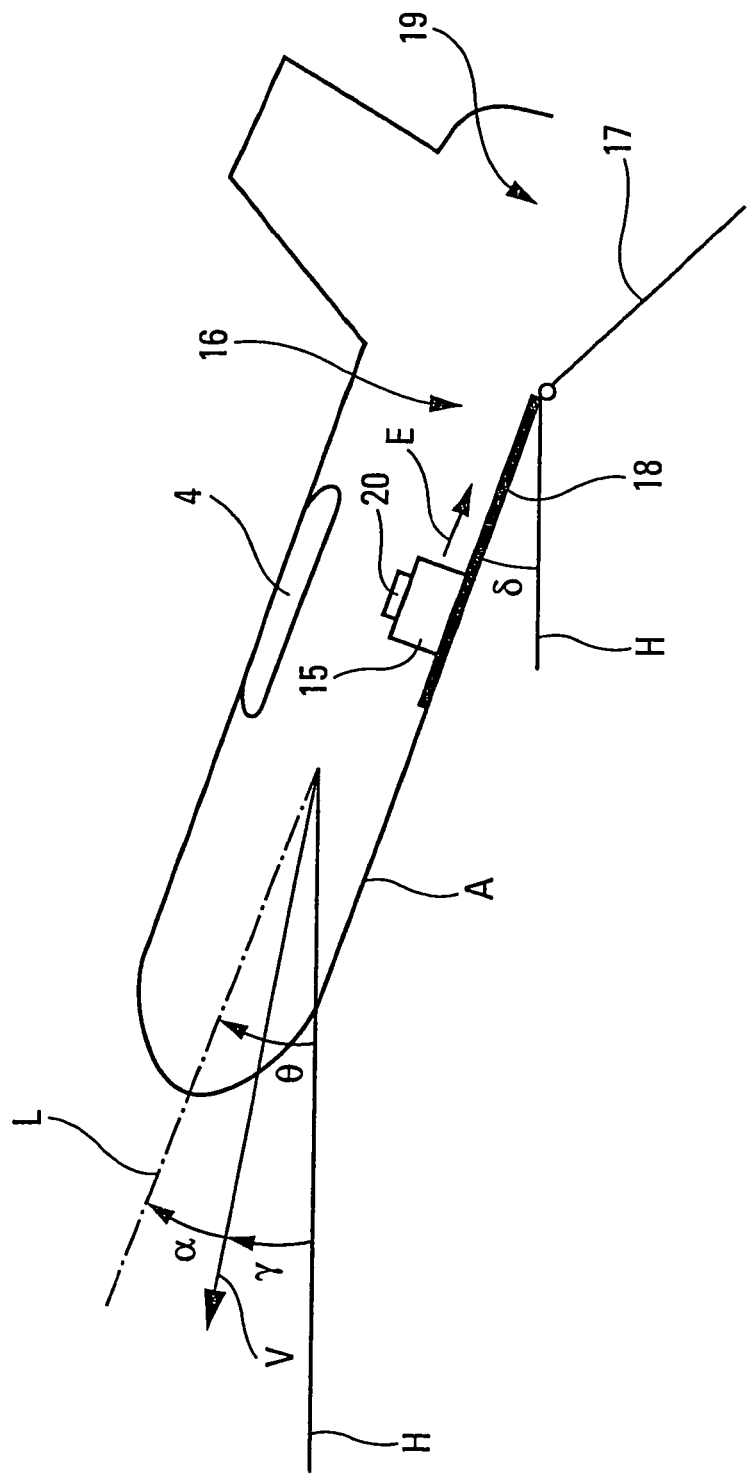
FIG. 2 is a diagrammatic illustration of an aircraft, to which is applied an attitude control device according to the invention for the purpose of dropping a transported load.

The device 1 according to the invention and shown diagrammatically in FIG. 1 is intended to control the attitude θ of an aircraft A partially shown, by way of illustration, in FIG. 2.

According to the invention, the said device 1 comprises:
spoilers 3 of the usual type, that are arranged on the wings 4 of the aircraft A and whose respective angular positions can be adjusted by an assembly 5 of normal controllable actuators 6, as illustrated by links 7 shown in dotted and dashed line;
means 8 for determining a command attitude of the aircraft A corresponding to an attitude (or attitude angle) that the aircraft A must achieve;
means 9 which are connected by a link 10 to the means 8, for calculating command positions of the said spoilers 3, corresponding to particular angular positions (that is to say positions or angles of deflection) of the said spoilers 3, making it possible to bring the aircraft A to the said command attitude; and
means 11 which are connected by a link 12 to the means 9, for calculating control instructions for the said controllable actuators 6, making it possible to bring the said spoilers 3 into the said command positions. The said control instructions are transmitted to the said assembly 5 of actuators 6 by the intermediary of a link 13.

The said means 8, 9 and 11 can be grouped in a central unit 14.

In the context of the present invention, spoilers 3 (which are known devices) are used in such a way that they implement a new function. In fact, it is known that spoilers 3 are normally used in various ways on an aircraft A but not in the way according to the invention described above. In particular, when set asymmetrically, the spoilers 3 serve to generate a roll and, when set symmetrically, they make it possible to decelerate the aircraft A (air brakes), to reduce the loads on the wings 4 under a load factor or turbulence, or to press the aircraft A against the ground and to improve the braking efficiency (ground spoilers). In the context of the present invention, as indicated above, the spoilers 3 are used to modify and to control the attitude of the aircraft A.

A preferred application of the device 1 according to the invention relates to the gravity dropping of a load 15 which is transported in a hold 16 of the aircraft A, as shown diagrammatically in FIG. 2.

In order to implement such a gravity drop:
A/ a door 17 of the said hold 16, at the rear of the aircraft A, is opened; and
B/ the angle of inclination δ of the floor 18 of the hold 16 upon which the load 15 stands, with respect to the horizontal H, is increased to a command value in order to allow, under the effect of gravitational forces, the sliding of the load 15 over the floor 18 and its ejection out of the hold 16 through an opening 19 created, at the rear of the aircraft A, by opening the said door 17.

One or more parachutes 20 which are attached to the load 15 are deployed after exiting the aircraft A and deposit the load 15 on the ground.

According to the invention, by controlling the attitude θ of the aircraft A, the said device 1 is able to control the angle of inclination δ of the floor 18 with respect to the horizontal H, and therefore to command and control the dropping of the load 15.

It is known that the angle of inclination δ is equal to the sum of the attitude angle θ (defined as the angle between the horizontal H and the longitudinal axis L of the aircraft A) and the setting angle of the floor 18 with respect to the said longitudinal axis L. Consequently, when this setting angle is zero, that is to say when the floor 18 is parallel with the longitudinal axis L of the aircraft A, the said angle of inclination δ is equal to the attitude angle θ which corresponds to the sum of the angles of gradient γ and of incidence α (defined with respect to the velocity vector V of the aircraft A).

Figure 3:
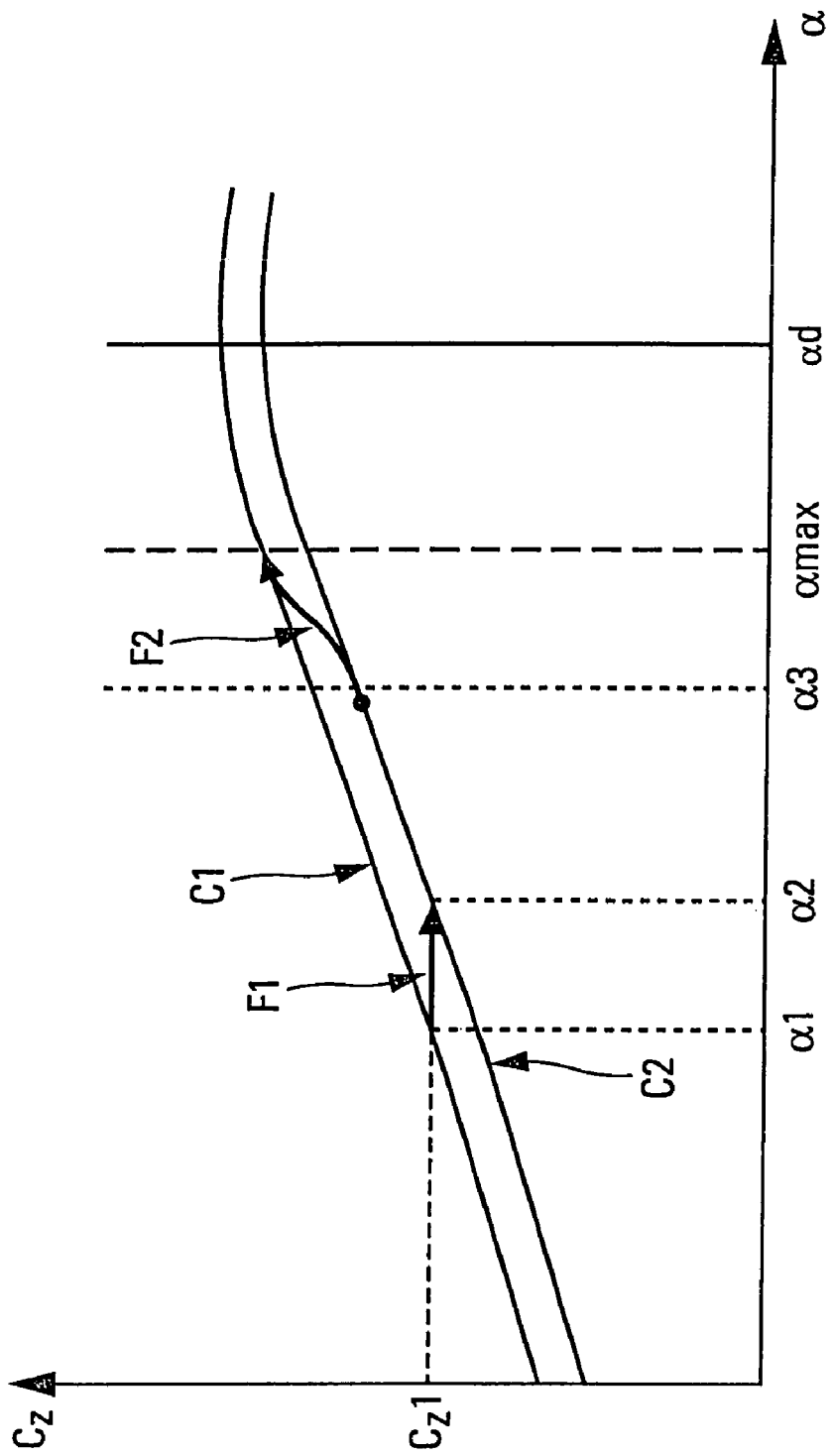
FIG. 3 is a graph making it possible to explain a particular characteristic of the invention.

In the case where it is desired to carry out a drop during level flight (constant altitude) at constant speed and at load factor equal to 1 (level flight and no turn), it results from the usual lift equation of the aircraft A that the lift Cz must remain constant. However, a setting in flight of the spoilers 3 has the consequence of reducing the said lift Cz. According to the invention, in order to compensate for this reduction of the lift Cz, the angle of incidence α is increased, as shown in FIG. 3. This FIG. 3 shows two curves C1 and C2 relating to two different particular setting angles of the spoilers 3, the setting angle of C2 being greater than that of C1, and showing the lift Cz as a function of the incidence α. For example, by increasing the deflection setting of the spoilers 3 in order to change from the deflection setting C1 to the deflection setting C2, it suffices, in order to guarantee constant lift, for example of value Cz1, to increase the incidence from α1 to α2, as illustrated by an arrow F1.

The fact of being able to carry out a drop in the conditions described above [constant speed, zero acceleration (as load factor equal to 1), fixed attitude, etc.] makes it possible to obtain good accuracy of the drop and therefore a good repeatability of the latter. Furthermore, the fact of acting only on the position of the spoilers 3 in order to implement the invention is also advantageous, because no structural modification of the aircraft A is necessary, since the spoilers 3 already exist in general on the aircraft A in order to implement other known functions, such as indicated above.

In a preferred embodiment of the invention, an automatic retraction of the spoilers 3 is carried out as soon as the angle of incidence α becomes greater than a predetermined value α3, for example during the passage through a zone of turbulence or during avoidance or clearance operations necessitating the application of a load factor. The movement of retraction of the spoilers 3 is sufficiently fast to make it possible not to reduce the angle of incidence safety margin with respect to a value αd corresponding to stalling. In practice, the angle of incidence α must remain below a maximum value αmax which is lower that the value αd. In fact the retraction of the spoilers 3 makes it possible to reduce the angle of incidence (for a constant lift Cz) to the value that it had before the start of the drop.

In order to do this, the device 1 comprises, as shown in FIG. 1:
  a means 21 for measuring the angle of incidence α of the aircraft A;
  a means 22 which is connected by a link 23 to the means 21 for comparing the measured value of the angle of incidence with the said predetermined value α3; and
  the said means 11 which are connected by a link 24 of the means 22 and which are formed, when the said measured value exceeds the said predetermined value α3, in order to apply automatically and by priority retraction control instructions to the said actuators 6 so that they automatically retract the said spoilers 3.

In FIG. 3, there has been shown, by way of example, an arrow F2 illustrating the automatic retraction of the spoilers 3 from an initial setting angle (for example 5°) with respect to the curve C2 to the angle (0° in this instance) with respect to the curve C1 which in this case corresponds to the complete retraction of the spoilers 3.

It will furthermore be noted that with the usual aforementioned solution using flaps of the aircraft and consisting in retracting the flaps in order to increase the incidence, the automatic redeployment of the said flaps in the case of reduction of incidence safety margin cannot be envisaged because the kinematics of the said flaps is not sufficiently fast to guarantee the re-establishment of an incidence safety margin compatible with the aforesaid maximum values. It is an entirely different matter for the control of the spoilers 3.

In a particular embodiment, the said means 9, for example a system already existing on the aircraft A, automatically calculate the command positions of the spoilers 3, as a function of parameters that represent the envisaged drop, such as the mass, the balance, the speed and/or the altitude of the aircraft A at the time of the drop. These parameters are received by the means 9 from usual information sources 25 by the intermediary of a link 26.

In a first embodiment, the deflection setting of the spoilers 3, whose command positions are calculated automatically as mentioned above, is initiated by a manual action of a pilot of the aircraft A on an appropriate means 27 which is, for example, connected by a link 28 to the means 11.

In another embodiment of the invention, the deflection setting (or command positions) of the spoilers 3 is calculated as in the said first embodiment, but it is initiated automatically by appropriate means 29 (connected by a link 30 to the means 11 and shown in dashed line) when the aircraft A changes into the drop configuration. It is considered, for example, that the aircraft A is in the drop configuration when the door 17 of the hold 16 is open. The means 29 are produced to be able to detect such an opening of the door 17. Furthermore, if necessary, the pilot can then adjust the position of the spoilers 3 and therefore the value of the attitude angle, for example using the means 27.

In another embodiment, the deflection setting of the spoilers 3 is also implemented automatically and, furthermore, a servo-control of the attitude angel is carried out automatically by acting on the position of the spoilers 3. For example, a sensor 31 measures the effective value of the attitude angle which is sent to the said means 9, through a link 32, which calculate a correction of the command positions of the spoilers 3 in order to obtain the said command attitude.

The invention claimed is:

1. A method for controlling the attitude of an aircraft, the aircraft comprising spoilers that are arranged on the wings and whose respective angular positions can be adjusted by controllable actuators, said method comprising:
  (a) determining a command attitude of the aircraft corresponding to an attitude that the aircraft must achieve;
  (b) calculating command positions of the spoilers, corresponding to particular angular positions of the spoilers, making it possible to bring the aircraft to the command attitude;
  (c) calculating control instructions for the controllable actuators, making it possible to bring the spoilers into the command positions; and
  (d) applying the control instructions to the actuators of the spoilers.

2. The method as claimed in claim 1, further comprising:
  (e1) determining, for each of the command positions of the spoilers, at least one relationship between the lift of the aircraft and the angle of incidence of the aircraft; and
  (e2) while applying the control instructions to the actuators of the spoilers, increasing the angle of incidence of the aircraft in such a way as to compensate for the reduction in the lift of the aircraft, due to the application of the control instructions, in order to maintain the lift of the aircraft substantially constant.

3. The method as claimed in claim 1, further comprising:

(f1) measuring the angle of incidence of the aircraft;

(f2) comparing the measured value of the angle of incidence with a predetermined value; and (f3) when the measured value exceeds the predetermined value, applying retraction control instructions automatically and by priority to the actuators in order that they automatically retract the spoilers.

4. The method as claimed in claim 1, wherein steps (a) to (c) are implemented automatically by the aircraft and step (d) is initiated by an action by a pilot of the aircraft.

5. The method as claimed in claim 1, wherein steps (a) to (c) are implemented automatically by the aircraft and step (d) is initiated automatically, when the aircraft passes into a particular configuration.

6. The method as claimed in claim 5, wherein a pilot of the aircraft adjusts, if necessary, the angular positions of the spoilers.

7. The method as claimed in claim 5, further comprising carrying out, in an automatic manner, a servo-control of the attitude angle of the aircraft, by the intermediary of an adjustment of the angular positions of the spoilers.

8. An aircraft, wherein it comprises a device able to implement the method as claimed in claim 1.

9. A method of dropping by gravity at least one load which is transported in a hold of an aircraft, said method comprising:

A/ opening a door of the hold; and

B/ increasing an angle of inclination of the floor of the hold up to a command value in order to allow, under an effect of gravitational forces, sliding of the load over the floor and its falling out of the hold through the door, wherein, in order to control the angle of inclination of the floor of the hold, the attitude of the aircraft is controlled, by implementing the method as claimed in claim 1.

10. The method as claimed in claim 9, wherein the command positions of the spoilers are calculated according to parameters which are representative of the load drop.

11. A device for controlling the attitude of an aircraft, said device comprising:

spoilers that are arranged on the wings of the aircraft and whose respective angular positions can be adjusted by controllable actuators;

a command attitude determining section that determines a command attitude of the aircraft corresponding to an attitude that the aircraft must achieve;

a command positions calculating section that calculates command positions of the spoilers, corresponding to particular angular positions of the spoilers, making it possible to bring the aircraft to the command attitude; and a control instruction calculating section that calculates control instructions for the controllable actuators, making it possible to bring the spoilers into the command positions, the control instructions being applied to the actuators of the spoilers.

12. An aircraft, wherein it comprises a device as claimed in claim 11.

* * * * *